US008128152B2

(12) United States Patent
Cho (10) Patent No.: US 8,128,152 B2
(45) Date of Patent: Mar. 6, 2012

(54) HANDLE FOR DOOR TRIM (75) Inventor: Han Shin Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/877,365

(22) Filed: Sep. 8, 2010

(65) Prior Publication Data

US 2011/0304172 A1 Dec. 15, 2011

(30) Foreign Application Priority Data

Jun. 11, 2010 (KR) .................. 10-2010-0055507

(51) Int. Cl.
*B60J 5/00* (2006.01)
(52) U.S. Cl. ............. 296/153; 296/146.7; 296/1.02
(58) Field of Classification Search .......... 296/153, 296/146.6, 146.7, 146.1, 1.02, 1.08, 1.09; 160/460, 502; 49/460, 502
See application file for complete search history.

(56) References Cited

U.S. PATENT DOCUMENTS

| 3,068,044 A | * | 12/1962 | Wilfert | 296/153 |
| 5,577,794 A | * | 11/1996 | Gandhi et al. | 296/146.6 |
| 6,149,224 A | * | 11/2000 | Tiberia et al. | 296/146.7 |
| 6,343,832 B1 | * | 2/2002 | Queener et al. | 296/202 |
| 7,380,864 B2 | * | 6/2008 | Guanzon et al. | 296/146.1 |
| 7,635,155 B2 | * | 12/2009 | Guanzon et al. | 296/146.1 |
| 7,762,600 B2 | * | 7/2010 | Shiono et al. | 296/1.02 |
| 2003/0116993 A1 | * | 6/2003 | Skarb et al. | 296/146.7 |
| 2010/0237643 A1 | * | 9/2010 | Bouillon | 296/1.08 |

FOREIGN PATENT DOCUMENTS

| JP | 59-47062 U | 3/1984 |
| JP | 60-161615 U | 10/1985 |
| JP | 7-81409 A | 3/1995 |
| KR | 2002-0040171 A | 5/2002 |

* cited by examiner

*Primary Examiner* — Jason S Morrow
(74) *Attorney, Agent, or Firm* — Morgan, Lewis & Bockius LLP (57) ABSTRACT A handle for a door trim is provided, which includes a grip handle having a lower end on which a fastening portion is formed to be mounted on an armrest of the door trim and an upper end which is formed in the shape of a grip to project from the upper end. The design of the handle for the door trim is greatly changed to improve the sense of beauty, and the stiffness of the handle is increased by adding a reinforcement material to the grip handle and the door trim to heighten the durability, so that the productivity and stability of the handle can be improved.

6 Claims, 7 Drawing Sheets

HANDLE FOR DOOR TRIM

CROSS-REFERENCE TO RELATED APPLICATION

This application is based on and claims priority from Korean Patent Application No. 10-2010-0055507, filed on Jun. 11, 2010 in the Korean Intellectual Property Office, the disclosure of which is incorporated herein in its entirety by reference.

BACKGROUND OF THE INVENTION

1. Field of the Invention

The present invention relates to a handle for a door trim, and more particularly, to a handle for a door trim which can improve the design change of a handle that is mounted on the door trim and the stiffness of the handle that is used in a vehicle body.

2. Description of the Prior Art

In general, a door trim is attached to an indoor side surface of a door. The door trim protects a passenger from impact, improves the indoor design, and enables convenience components such as an armrest and so on to be mounted thereon.

Since the door trim is a component that is directly in contact with the body of a passenger when side collision occurs, it greatly affects the side impact performance.

Also, a door for a passenger's getting into/out of a vehicle is installed in the vehicle, and on the inside surface of the door, an armrest is installed on the door trim so that a passenger can conveniently put his/her arm thereon.

The door trim and the armrest are installed on a door frame that is formed by combining an inner panel and an outer panel with each other, and include a door trim which is combined with the inner panel and which the armrest is combined with, and an armrest cover combined with the outside of the armrest.

The armrest is formed to project from the door trim and covers the whole door trim. The armrest is formed to be relatively long so that even a passenger's elbow can be put thereon.

On the other hand, the armrest is mostly positioned at a height of the abdominal region of a passenger, and may greatly injure the abdominal region of the passenger when side collision occurs.

FIGS. 1A to 1C are views illustrating a handle for a door trim in the related art.

The handle for a door trim in the related art is mounted on an armrest of the door trim for a vehicle, and may be divided according to the design of the handle and the mounting position of the handle.

FIG. 1A illustrates a vertical handle. The vertical handle H1 has one side that is fastened to an armrest 10 of a door trim 1, and the other side that is mounted on an upper end of the door trim 1. The handle H1 shows a vertical shape, and a vehicle passenger can hold the handle H1 through a space between the handle H1 and the door trim 1.

FIG. 1B illustrates a horizontal handle. The horizontal handle H2 is installed in the horizontal direction on one side of the door trim 1 to show a horizontal shape. A vehicle passenger can hold the handle H2 through a space between the handle H2 and the door trim 1.

FIG. 1C illustrates a full type handle. The full type handle H3 is formed in a similar shape to the vertical handle, and has a groove formed between the handle H3 and the door trim 1 instead of an open space. A vehicle passenger can hold the handle H3 through the groove formed between the handle H3 and the door trim 1.

Figure 1:
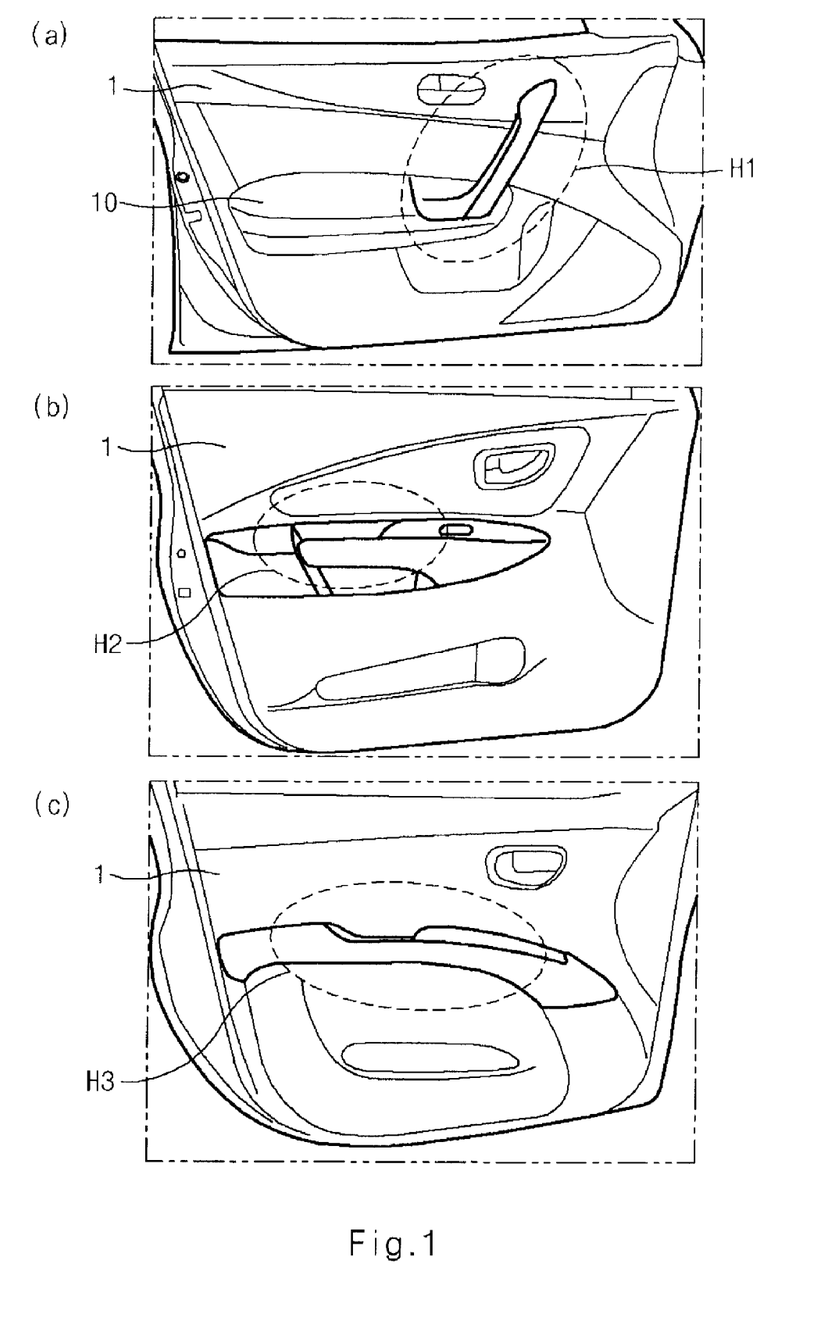
FIGS. 1A to 1C are views illustrating a handle for a door trim in the related art.

However, since designs of the handle for a door trim in the related art are limited to three types, i.e. vertical, horizontal, and full types, as illustrated in FIG. 1, a user's selection is restricted in these designs having similar shapes, which are not up to the expectation of consumers.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a handle for a door trim mounted on the door trim, which can improve the design change of a handle that is mounted on the door trim and the stiffness of the handle that is used in a vehicle body when a door is opened or closed.

In an aspect of the present invention, the handle for a door trim may include a grip handle having a lower end on which a fastening portion is formed to be mounted on an armrest of the door trim and an upper end which is formed in the shape of a grip to project from the armrest, wherein the upper end of the grip handle projects upwards from the armrest.

The grip handle may include an inner grip handle having the fastening portion formed thereon and fastened to the armrest, an outer grip handle provided on the outside to correspond to the inner grip handle, and an inner reinforcement inserted between the inner grip handle and the outer grip handle to improve the stiffness of the grip handle.

An outer reinforcement may be provided between a reinforcement panel mounted on a side surface of the door trim including the armrest and the grip handle to facilitate the fastening of the reinforcement panel and the grip handle.

The outer reinforcement may be disposed between the reinforcement panel and the inner grip handle and the inner grip handle is mounted thereto, wherein the outer reinforcement is mounted to the reinforcement panel.

A through-hole may be formed on the upper end of the grip handle to improve the grip.

With the construction as described above according to an embodiment of the invention, the design of the handle for the door trim is greatly changed to improve the sense of beauty, and the stiffness of the handle is increased by adding a reinforcement material to the grip handle and the door trim to heighten the durability, so that the productivity and stability of the handle can be improved.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
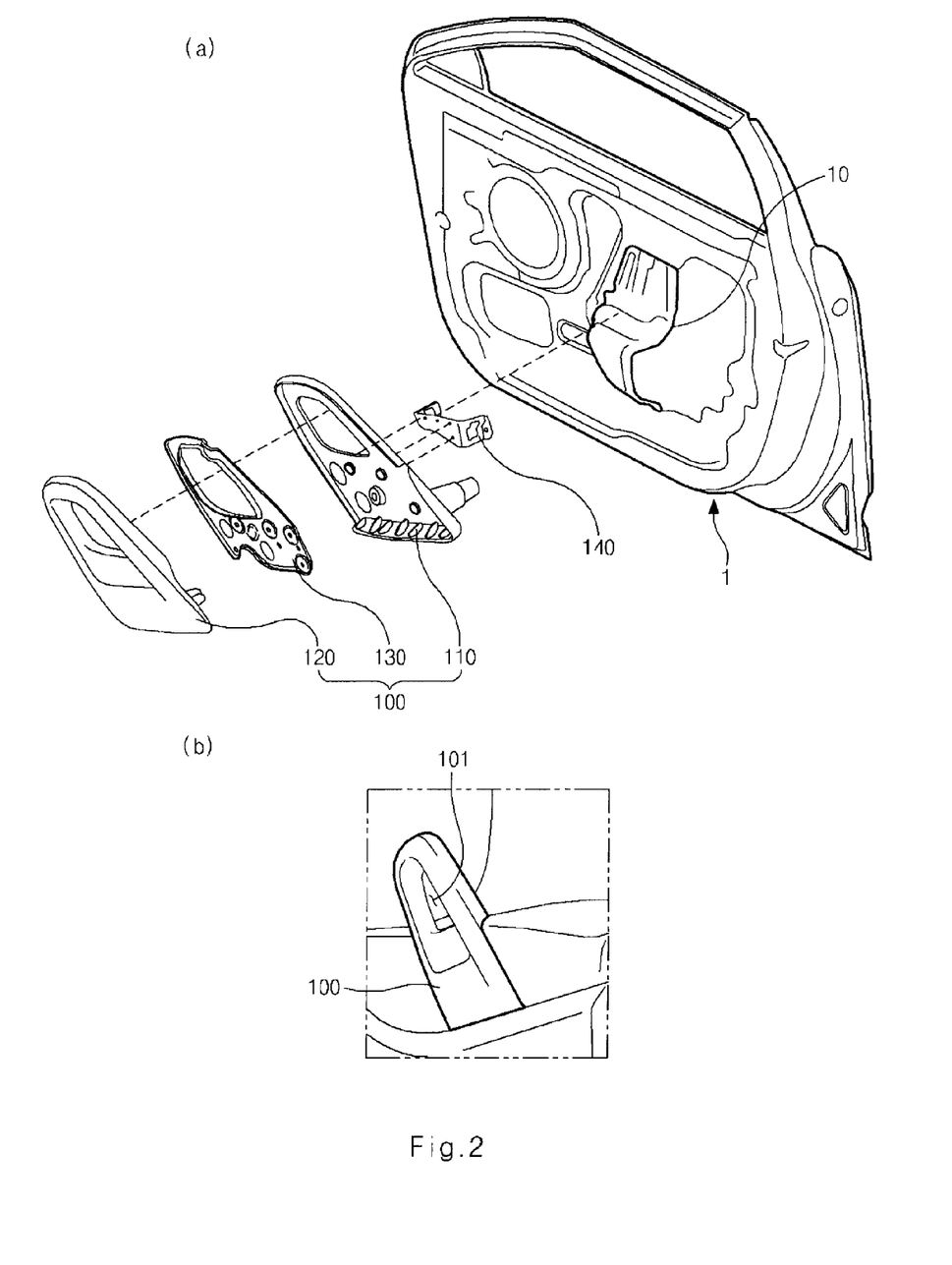
FIG. 2A is an exploded perspective view of a handle for a door trim according to an embodiment of the invention.
FIG. 2B is a view illustrating a handle for a door trim according to an embodiment of the invention.
Figure 3:
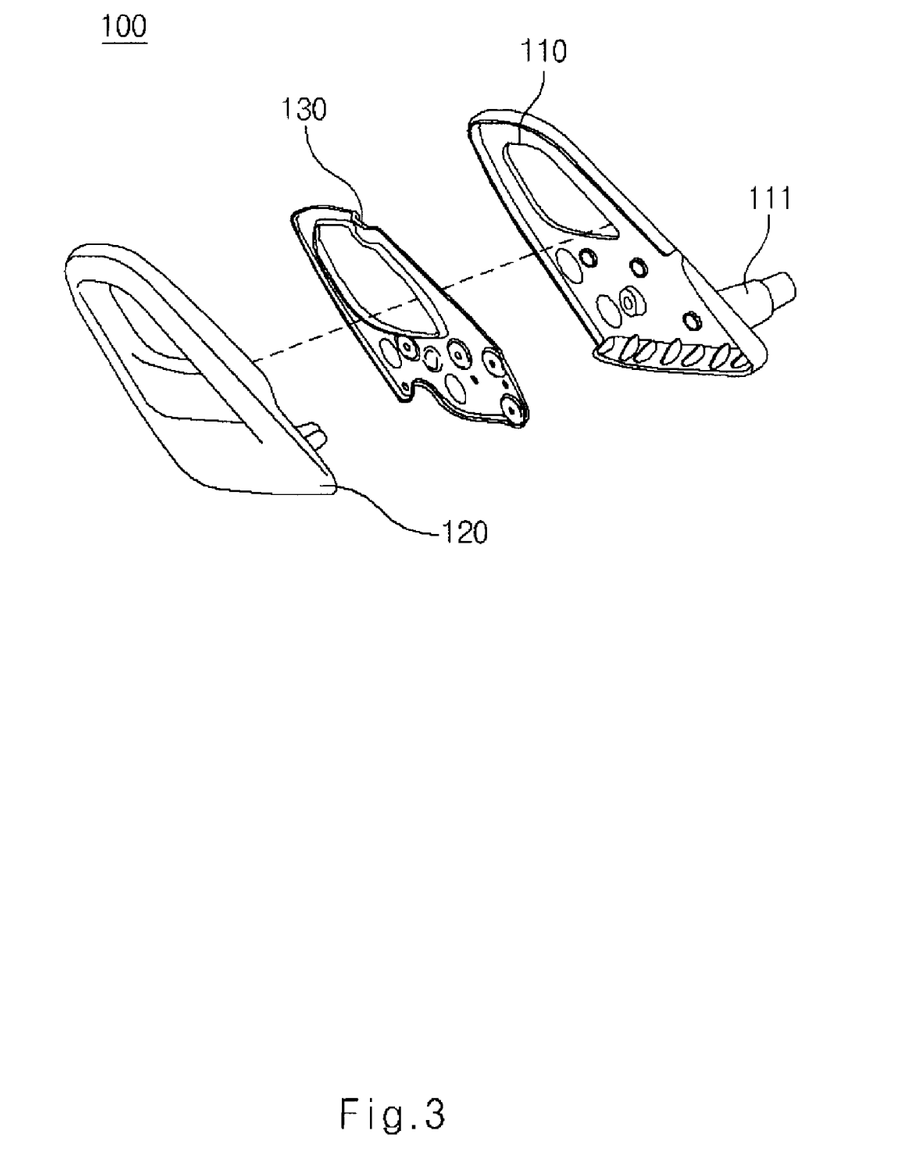
FIG. 3 is an exploded perspective view of a grip handle of a handle for a door trim according to an embodiment of the invention.
Figure 4:
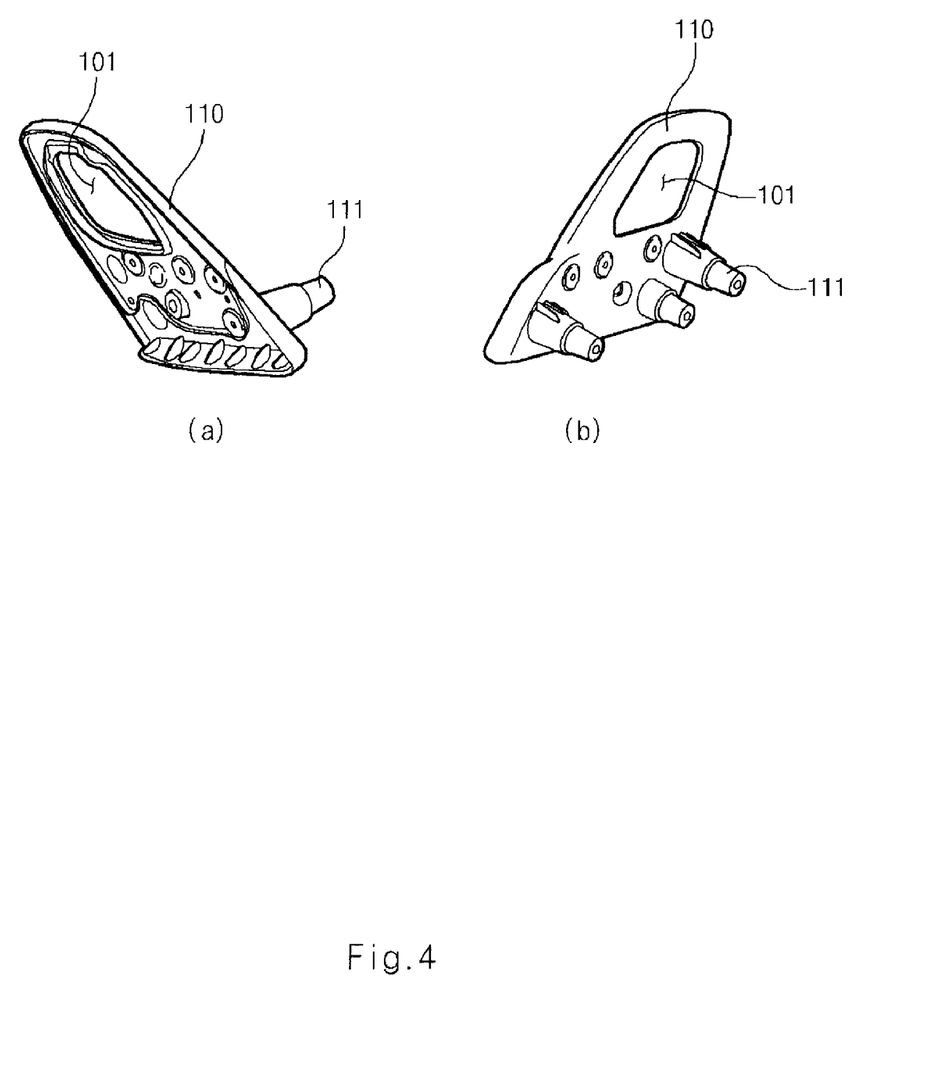
FIGS. 4A and 4B are views illustrating a front surface and a rear surface of an inner grip handle of a handle for a door trim according to an embodiment of the invention.

FIGS. 2A to 7B illustrate a handle for a door trim according to an embodiment of the present invention. FIGS. 2A and 2B are views illustrating a handle for a door trim according to an embodiment of the present invention, FIG. 3 is an exploded perspective view of a grip handle of a handle for a door trim according to an embodiment of the present invention, and FIGS. 4A and 4B are views illustrating a front surface and a rear surface of an inner grip handle of a handle for a door trim according to an embodiment of the present invention.

Figure 5:
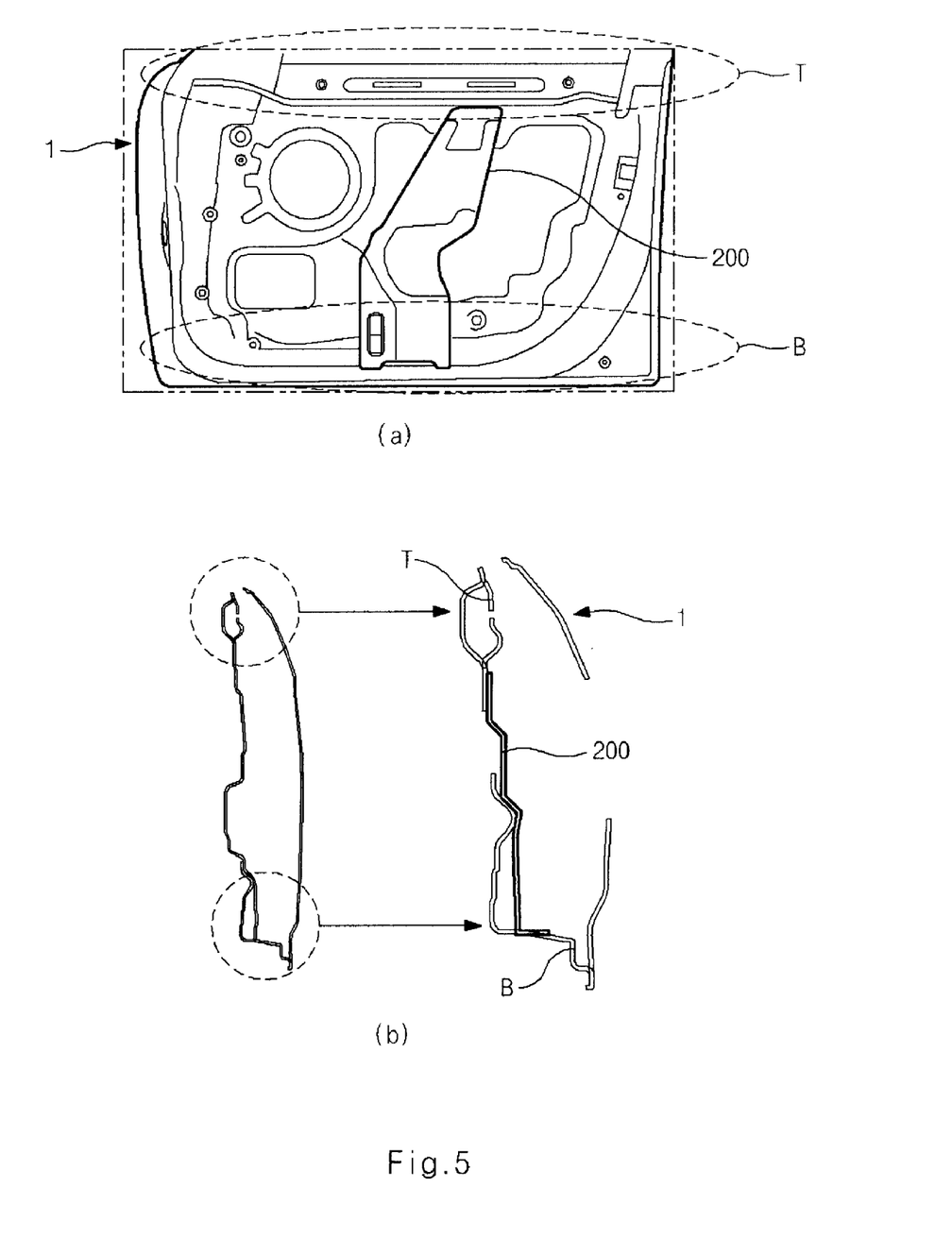
FIG. 5A is a view illustrating a door trim of a handle for the door trim according to an embodiment of the invention.
FIG. 5B is a sectional view illustrating a door trim of a handle for the door trim according to an embodiment of the invention.
Figure 6:
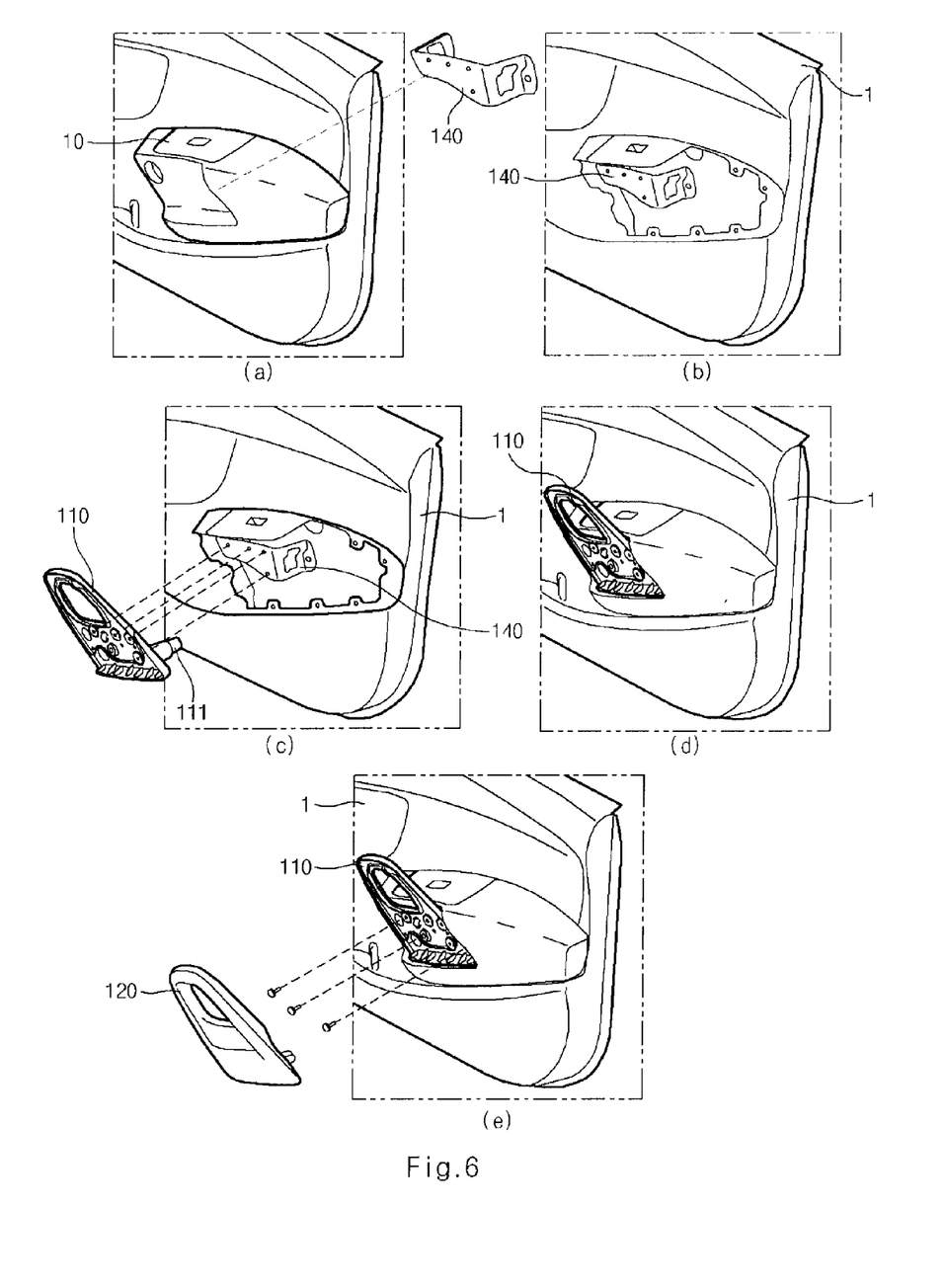
FIGS. 6A to 6E are views explaining the steps of mounting a grip handle on a door trim in a handle for the door trim according to an embodiment of the invention.

Also, FIGS. 5A and 5B are views illustrating a door trim of a handle for the door trim according to an embodiment of the present invention, FIGS. 6A to 6E are views explaining the steps of mounting a grip handle on a door trim in a handle for the door trim according to an embodiment of the present invention, and FIGS. 7A and 7B are views illustrating a mount state of a grip handle in a handle for door trim according to an embodiment of the present invention.

Hereinafter, exemplary embodiments of the present invention will be described in detail with reference to the accompanying drawings.

As illustrated in FIGS. 2A to 7B, a handle for a door trim according to an embodiment of the present invention includes a grip handle 100 having a lower end on which a fastening portion 111 is formed to be mounted on an armrest 10 of the door trim 1, and an upper end which is formed in the shape of a grip to project from the upper end, and thus the sense of beauty and the stability of the handle can be improved.

Hereinafter, the respective components of a handle for a door trim according to an embodiment of the present invention will be described with reference to the accompanying drawings.

As illustrated in FIG. 2, the grip handle 100 according to an embodiment of the present invention is mounted on the armrest 10 of the door trim 1. The grip handle 100 is in the form of a tetragonal panel. The fastening portion 111 formed on the lower end of the grip handle 100 is mounted on the armrest 10, and the upper end of the grip handle 100 projects upwardly from the armrest 10.

It is preferable that a through-hole 101 is formed on the upper end of the grip handle 200 to improve a user's grip when the user opens or closes a door.

As illustrated in FIGS. 3, 4A and 4B, the grip handle 100 is composed of an inner grip handle 110, an outer grip handle 120, and an inner reinforcement 130.

The inner grip handle 110 has the fastening portion 111 formed thereon, and can be fastened to the armrest 10. The outer grip handle 120 is provided on the outside to correspond to the inner grip handle 110, and the inner reinforcement 130 is inserted between the inner grip handle 110 and the outer grip handle 120.

In this case, fastening grooves are formed on the armrest 10. The fastening portion 111 of the inner grip handle 110 is inserted into the fastening grooves of the armrest 10, and then the inner grip handle 110 is fastened to the armrest 10. It is preferable that a plurality of fastening portions 111 and fastening grooves is provided.

Here, in an exemplary embodiment of the present invention, the combination of the inner grip handle 110 including the inner reinforcement 130 and the outer grip handle is performed through screws to improve the fastening performance of the handle.

Also, the inner grip handle 110 and the outer grip handle 120 are formed of a plastic material, and thus the grip is improved when a user holds the grip handle 100 to open/close the door. The inner reinforcement 130 is formed of a steel material, and improves the whole stiffness of the grip handle 100.

As illustrated in FIGS. 5A and 5B, in the door trim 1, a reinforcement panel 200 is additionally provided between the upper end portion T having a high stiffness and the lower end portion B having a low stiffness, and the upper end portion and the lower end portion of the door trim 1 are connected together to improve the panel stiffness of the door trim 1.

On the other hand, as illustrated in FIGS. 2A and 6A, an outer reinforcement 140 of a steel material is provided between the armrest 10 having the reinforcement panel 200 mounted thereon and the grip handle 100, and the fastening of the reinforcement panel 200 and the grip handle 100 is facilitated. In this case, it is preferable that the fastening of the outer reinforcement 140 is performed through welding nuts.

Hereinafter, the operation and effect of the handle according to an embodiment of the present invention will be described.

As illustrated in FIGS. 2 to 5, the grip handle 100 according to an embodiment of the present invention is composed of the inner grip handle 110, the outer grip handle 10, and the inner reinforcement 130. The grip handle 100 has the lower end on which the fastening portion 111 is formed and the upper end which is formed to project in the shape of a grip, and is mounted on the armrest 10 of the door trim 1.

FIGS. 6A to 6E are views explaining the steps of mounting the grip handle 100 on the door trim 1. As illustrated in FIG. 6A, the outer reinforcement 140 is positioned on the side surface of the door trim 1, to which the reinforcement panel 200 (see FIG. 5) is added to improve the stiffness, and the outer reinforcement 140 is mounted on the side surface of the door trim 1 through the welding nuts (not illustrated).

FIG. 6B illustrates the outer reinforcement 140 mounted on the door trim 1, and FIG. 6C illustrates steps of mounting the inner grip handle 110 that includes the inner reinforcement 130 on the door trim 1, on which the outer reinforcement 140 is mounted. In this case, the fastening of the inner grip handle 110 and the door trim 1 is performed by bolts.

Figure 7:
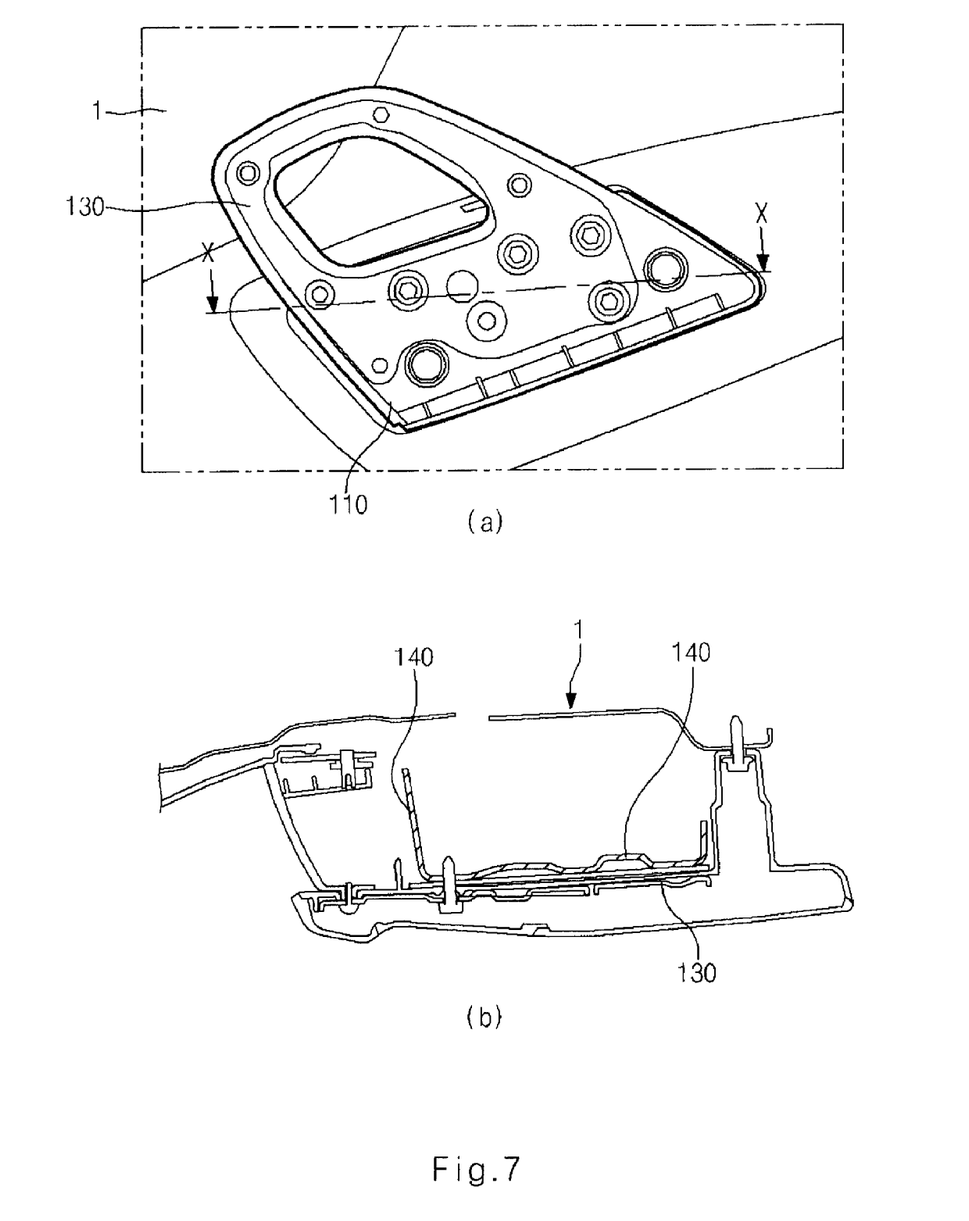
FIG. 7A is a view illustrating a mount state of a grip handle on a door trip in a handle for the door trim according to an embodiment of the invention.
FIG. 7B is a sectional view taken along line X-X of FIG. 7A.

In this case, the cross section of the door trim 1, on which the inner grip handle 110 is mounted, is illustrated in FIG. 7. Through FIG. 7, the structure of the grip handle 100 that is mounted on the door trim 1 can be confirmed, and it can be recognized that the stiffness of the door panel can be improved by the outer reinforcement 140 provided between the door trim 1 and the grip handle 100 and the inner reinforcement 130 inserted into the grip handle 100.

On the other hand, the inner grip handle 110 is mounted on the door trim 1 as shown in FIG. 6D, and in a state where the inner grip handle 110 is mounted on the door trim 1, the outer grip handle 120 is finally fastened to the inner grip handle 110 through bolts as shown in FIG. 6E.

As described above, the handle for a door trim according to an embodiment of the present invention includes the grip handle having the lower end on which the fastening portion is formed to be mounted on the armrest of the door trim, and the upper end which is formed in the shape of a grip to project from the upper end. Accordingly, the design of the handle for the door trim is greatly changed to improve the sense of beauty, and the stiffness of the handle is increased by adding a reinforcement material to the grip handle and the door trim to heighten the durability, so that the productivity and stability of the handle can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A handle for a door trim, comprising:
   a grip handle having a lower end on which a fastening portion is formed to be mounted on an armrest of the door trim and an upper end which is formed in the shape of a grip to project from the armrest;
   wherein the grip handle comprises:
      an inner grip handle having the fastening portion formed thereon and fastened to the armrest;
      an outer grip handle provided on the outside to correspond to the inner grip handle; and
      an inner reinforcement inserted between the inner grip handle and the outer grip handle to improve the stiffness of the grip handle.

2. The handle for the door trim according to claim 1, wherein the upper end of the grip handle projects upwards from the armrest.

3. The handle for the door trim according to claim 1, wherein an outer reinforcement is provided between a reinforcement panel mounted on a side surface of the door trim including the armrest and the grip handle to facilitate the fastening of the reinforcement panel and the grip handle.

4. The handle for the door trim according to claim 3, wherein the outer reinforcement is disposed between the reinforcement panel and the inner grip handle and the inner grip handle is mounted thereto.

5. The handle for the door trim according to claim 4, wherein the outer reinforcement is mounted to the reinforcement panel.

6. The handle for the door trim according to claim 1, wherein a through-hole is formed on the upper end of the grip handle to improve the grip.

* * * * *